United States Patent [19]
Preiss

[11] Patent Number: 5,052,745
[45] Date of Patent: Oct. 1, 1991

[54] WIND DEFLECTOR FOR SLIDING ROOFS, REMOVABLE ROOF SECTIONS OR THE LIKE OF MOTOR VEHICLES

[75] Inventor: Michael Preiss, Vaihingen/Enz-Aurich, Fed. Rep. of Germany

[73] Assignee: Dr. Inc. h.c.F. Porsche AG, Fed. Rep. of Germany

[21] Appl. No.: 448,860

[22] Filed: Dec. 12, 1989

[30] Foreign Application Priority Data

Dec. 19, 1988 [DE] Fed. Rep. of Germany ....... 3842676

[51] Int. Cl.$^5$ .............................................. B60J 7/22
[52] U.S. Cl. ................................. 296/217; 296/180.5
[58] Field of Search .............................. 296/217, 180.5

[56] References Cited

U.S. PATENT DOCUMENTS 4,291,912 9/1981 Fox et al. ............................. 296/217
4,630,859 12/1986 Bienert et al. ....................... 296/217

FOREIGN PATENT DOCUMENTS 3415361 10/1985 Fed. Rep. of Germany .
7811769 6/1980 Netherlands ....................... 296/217

Primary Examiner—Dennis H. Pedder
Attorney, Agent, or Firm—Evenson, Wands, Edwards, Lenahan & McKeown

[57] ABSTRACT

In a motor vehicle equipped with a sliding roof, a wind deflector is provided to avoid disturbing vibrations in the vehicle interior. The wind deflector is movable between a retracted position and an extended, operative position. An additional air guiding element of narrower width than the wind deflector is mounted locally of the wind deflector. The air guiding element is movable between a first position in a depression of the wind deflector and a second operative position in which the air guiding element projects beyond the wind deflector in an upward direction. The air guiding element moves into the second position coincidentally with movement of the wind deflector into the operative position.

11 Claims, 3 Drawing Sheets

WIND DEFLECTOR FOR SLIDING ROOFS, REMOVABLE ROOF SECTIONS OR THE LIKE OF MOTOR VEHICLES

BACKGROUND AND SUMMARY OF THE INVENTION

The invention relates to a motor vehicle wind deflector for sliding roofs, removable roof sections or the like, wherein the wind deflector is arranged adjacent to a transversely extending front edge of the roof cut-out for the movable roof and is movable from a recessed stored inoperative position into a moved-out, erected operative position.

From DE-OS 34 15 361, a motor vehicle having a sliding roof and a pivotable wind deflector is known. Here, after opening of the sliding roof, a wind deflector, which is arranged adjacent to the transversely extending front edge area of the roof section, automatically takes up a moved-out erected operative position. Tests with vehicles of this type have shown that during the driving operation when the sliding roof is open, disturbing vibrations occur in the vehicle interior despite the tilted-out wind deflector. These vibrations become noticeable as noises, pressure in the ears, or rattling of doors and windows. These vibrations (which are also called sliding roof rumbling) differ from one vehicle to the next. They depend on, among other things, the shape of the roof, the ventilation of the interior, the size of the roof cut-out and the driven speed of the vehicle.

The vibrations are caused by the fact that the air flow guided over the vehicle roof breaks off at the transversely extending front edge of the roof cut-out, or at the wind deflector. Also, at a slow driving speed, wind does not overcome the roof cut-out but flows into the vehicle interior located below it. However, at the same time, as a result of the increased flow velocity above the roof cut-out, an under pressure is generated in the vehicle interior which seeks to take in air through the cut-out. Both flows cause disturbing turbulences which happen in a periodically alternating manner. As a result, a pulsating (close to resonance frequency) of an air column takes place in the vehicle interior which becomes extremely annoying (E.G. noise, pressure in the ears, etc.).

It is the object of the invention to avoid the occurrence of these disturbing vibrations (sliding roof rumbling) in the vehicle interior in motor vehicles having a sliding roof and a wind deflector during open roof driving operations.

According to the invention, this object is achieved by providing at least one additional air guiding element of narrow width, arranged locally at the wind deflector. This air guiding element projects beyond this wind deflector in an upward direction in the operative position of the wind deflector.

It is also advantageous if the air guiding element is preferably provided adjacent to a longitudinal center plane of the motor vehicle. The width of the air guiding element should amount to at least 1/10 of the width of the roof cut-out. The overall height from the front edge of the roof cut-out to an upper edge of the moved-out air guiding element should amount to at least 1/7 of the length of the roof cut-out. The length of the additional air guiding element must amount to at least 1/10 of the length of the roof cut-out.

It is also advantageous if the air guiding element is adjusted more steeply than the wind deflector, with the angle of difference amounting to approximately 30 degrees. The air guiding element can be firmly or flexibly connected with the wind deflector and can be moved from a moved-in retracted position into a moved-out extended position and vice-versa.

The wind deflector can be formed by a profiled sheet metal part with a depression directed toward the vehicle interior in the area of the air guiding element for accommodating the moved-in air guiding element. The flexible connection for the air guiding element may be created by way of a horizontally aligned, transversely extending shaft, flexibly connected with the wind deflector and with spring elements moving the air guiding element in a tilt-out direction about the shaft.

It is also desirable if a support area is provided at the wind deflector adjacent to its free end for limiting the operative position of the air guiding element as it is positioned relative to the deflector. The wind deflector is provided with an end-side lengthening extension adjacent to this support area. This extension is in alignment with the course of the shape of the wind deflector.

To assist retraction of the air guide element a guide shoe is mounted at a front edge of a cover. This guide shoe moves the air guiding element into the retracted moved-in position as the cover is closed.

The principal advantages achieved by the invention, as a result of the arrangement of an additional air guiding element having a narrow width at the wind deflector, is an elimination of disturbing vibrations in the vehicle interior. Preferably, the air guiding element which, in the operative condition, projects beyond the wind deflector in upward direction, is arranged adjacent to a longitudinal center plane of the motor vehicle. Over the course of its width, the air guiding element deflects the flow at a higher level so that the roof cut-out is overcome. On both sides of the air guiding element, the air, in addition, is also moved over the roof cut-out. In the laterally exterior zones of the roof cut-out, the flow is almost unaffected by the additional air guiding element, but it can no longer combine to form the large periodic alternations. The additional air guiding element therefore interferes with the formation of turbulences, divides them and prevents the periodic vibrating of the air column in the vehicle interior.

Other objects, advantages and novel features of the present invention will become apparent from the following detailed description of the invention when considered in conjunction with the accompanying drawings.

DETAILED DESCRIPTION OF THE DRAWINGS

Figure 1:
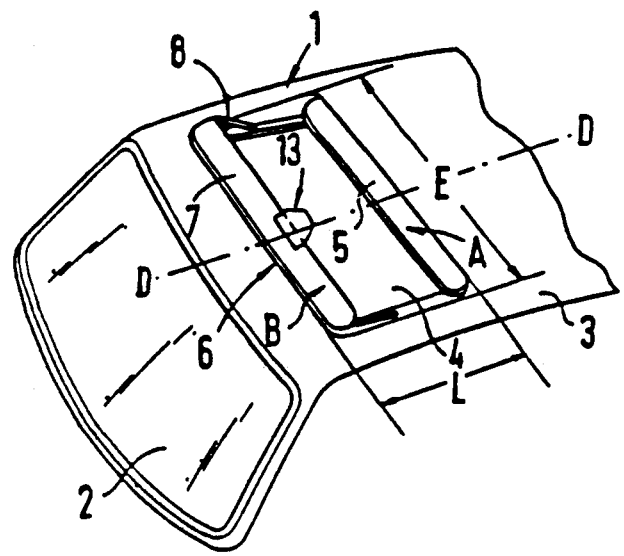
FIG. 1 is a perspective partial view of a motor vehicle roof equipped with a sliding roof and a wind deflector.

FIG. 1 shows a vehicle windshield 2 and a roof area 3 with an approximately rectangular roof cut-out 4 for a sliding or removable roof section, or the like. The roof cut-out 4 can be closed by a cover 5 (or a sliding roof cover 5). In FIG. 1, the sliding cover 5 is in its moved-in open position A. A wind deflector 7 is arranged adjacent to the transversely extending front edge 6 of the roof cut-out 4 and is shown in its moved-out raised operative position B.

Figure 3:
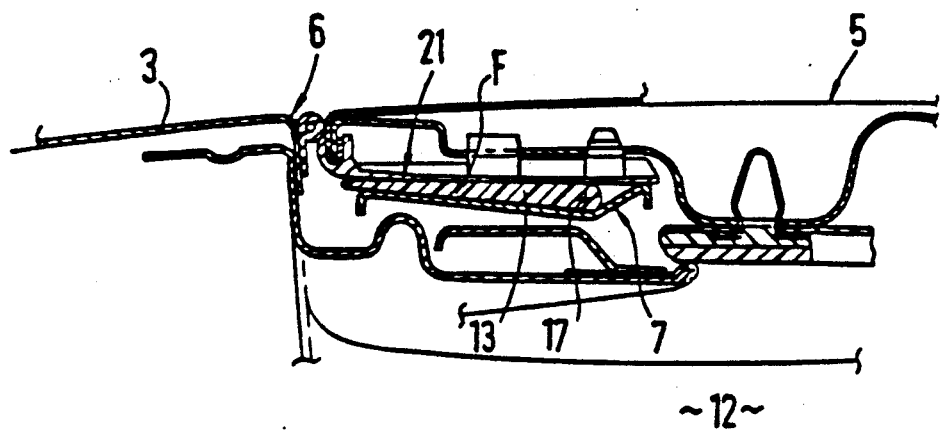
FIG. 3 is a sectional view according to Line III—III of FIG. 2, the wind deflector and the air guiding element being in a moved-in inoperative position.

The wind deflector 7 interacts with a tilt-out mechanism 8 at its two exterior end areas in a known manner such that when the sliding cover 5 is opened, the wind deflector 7 is automatically moved into the operative position B, whereas when the sliding cover is closed, the deflector 7 is automatically brought into its moved-in inoperative position shown in FIG. 3 In top view, the wind deflector 7 is shaped to the contour of the transversely extending front edge 6 of the roof cut-out 4.

Figure 4:
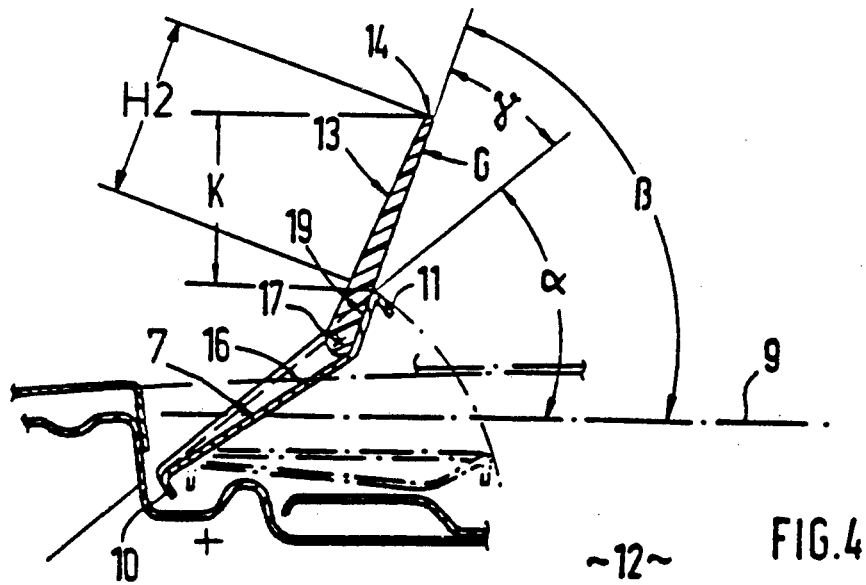
FIG. 4 is a sectional view corresponding to FIG. 3, with the wind deflector and the air guiding element taking up their moved-out operative position.

In the operative position B, the wind deflector 7 is adjusted at an angle α with respect to a horizontal auxiliary plane 9 (FIG. 4). In the embodiment, the wind deflector 7 is constructed of aluminum or steel plate. At the upper and the lower vertical end (referencing the extended view of FIG. 4), the wind deflector 7 has approximately rectangular bent portions 10, 11, respectively. The bent portions are directed toward an interior 12 of the motor vehicle 1.

In order that no bothersome vibrations (sliding roof rumbling) occur in the vehicle interior 12 during the driving operation (wind deflector extended), an additional air guiding element 13 having a narrow width is arranged at the top side of the wind deflector 7. This air guiding element 13 projects beyond this wind deflector 7 in upward direction to an extent K during the operative position B of the wind deflector 7.

Figure 6:
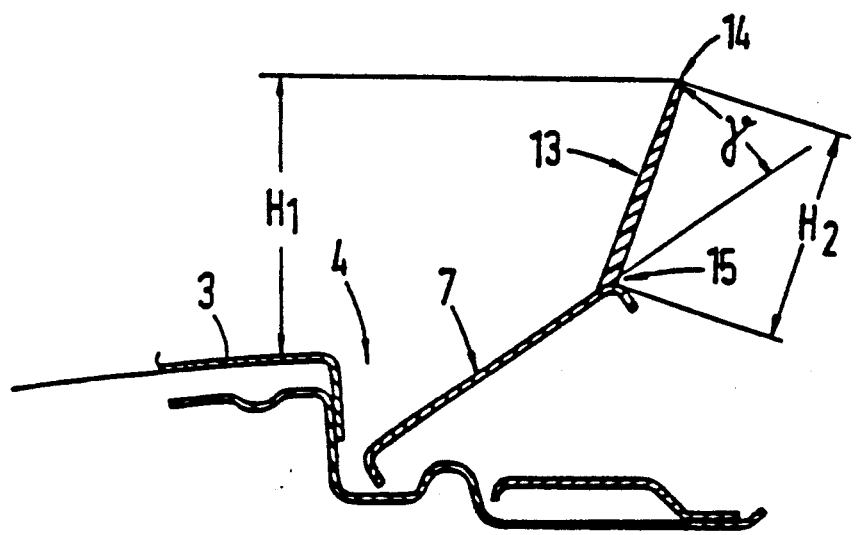
FIG. 6 is a sectional view corresponding to FIG. 3 with another embodiment of a wind deflector and an air guiding element.

According to FIG. 1, the air guiding element 13 is preferably arranged in the area of a longitudinal center plane D—D of the motor vehicle 1 and extends for a short distance on both sides of this longitudinal center plane D—D. Alternatively, instead of the center arrangement, two guiding elements could be located, one adjacent to each longitudinal side of the roof cut-out 4. The dimensions of the air guiding element 13 depend on the shape of the roof-cut out 4 and the wind deflector 7. The width of the air guiding element 13 should be at least 1/10 of the width E of the roof cut-out 4. A widening of the air guiding element 13 does not impair the operation but a significant shortening would. In the operative position B of the wind deflector 7, the overall height $H_1$ from the transversely extending front edge 6 of the roof cut-out 4 to an upper edge 14 of the air guiding element 13 should amount to at least 1/7 of the length L of the roof cut-out 4 (FIG. 6). The height $H_2$ of the air guiding element 13 should amount to approximately 1/10 of the length L of the roof cut-out 4. In order to nevertheless reach the overall height $H_1$, the air guiding element 13 must be adjusted more steeply than the wind deflector 7. An increase of heights $H_1$ and $H_2$ is not disadvantageous for the effect of the air guiding element 13, but a significant shortening would be. The air guiding element 13 takes up an angle 8 with respect to the horizontal auxiliary plane 9 (FIG. 4). The difference δ of these two angles β and α amounts to approximately 30 degrees.

According to a first embodiment (FIG. 6), the air guiding element 13 is firmly connected with the wind deflector 7. For example, the deflector could be attached by gluing or vulcanizing. The air guiding element 13 is made of rubber, plastic or the like and extends away from the upper free edge 15 of the wind deflector 7. The cross-section of the air guiding element 13 is reduced continuously in upward direction and ends in a rounded upper end area.

In a second embodiment (FIGS. 2, 3, 4 and 5), the air guiding element 13 is flexibly connected with an upper end area of the wind deflector 7. In the area of the width of the air guiding element 13, the wind deflector 7 has a depression 16, the bottom of which is directed to the vehicle interior and which receives the air guiding element 13 when the wind deflector is in its withdrawn position (Position F) in FIG. 3. The depression 16 (in vertical view) is adapted to the cross-sectional shape of the air guiding element 13. Laterally, the impression 16 extends at a distance to the air guiding element 13. If space conditions allow it, a depression 16 is not necessary, in which case the moved-in air guiding element 13 is disposed directly atop the wind deflector 7.

The air guiding element 13 is flexibly connected with the wind deflector 7 by way of a horizontally aligned transversely extending shaft 17. One coaxially arranged spring element 18 (FIG. 2) is respectively provided at both end areas of the air guiding element 13 to bias the air guiding element 13 into a tilt-out direction. The moved-out operative position G (FIG. 4) of the air guiding element 13 is limited by a diagonally extending support area 19 of the wind deflector 7. The support area 19 is partially located above the shaft 17. The wind deflector 7 has an end-side extension 20 (FIG. 5) behind the support area 19. This extension 20 is provided to reduce wind noise in the vehicle interior at higher speeds than the critical speed which causes the sliding roof rumbling.

Figure 7:
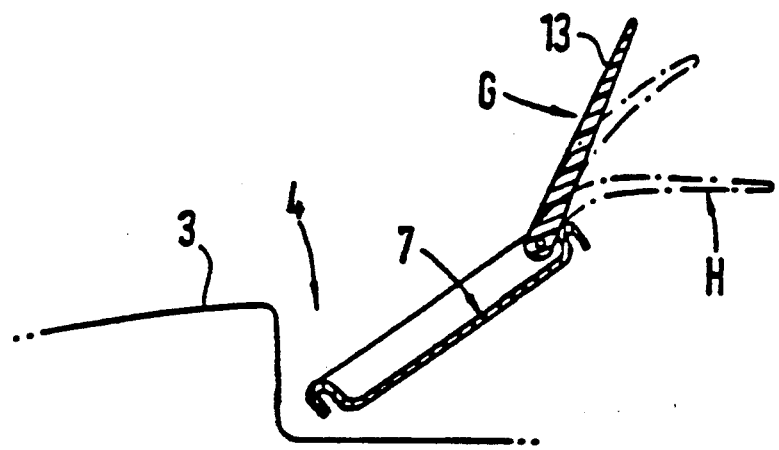
FIG. 7 is a sectional view corresponding to FIG. 3 with another embodiment of a wind deflector and an air guiding element.

FIG. 7 shows a flexible elastic air guiding element 13 which is deflected by wind during vehicle motion. The cross-section and selection of material of this flexible element 13 obtains the aforementioned angle δ (position G in FIG. 4) at a vehicle speed of 80 km/h). Increasing wind force at higher speeds causes the guide element to have a reduced angle until it eventually reaches an approximately horizontal end position H (FIG. 7).

Figure 5:
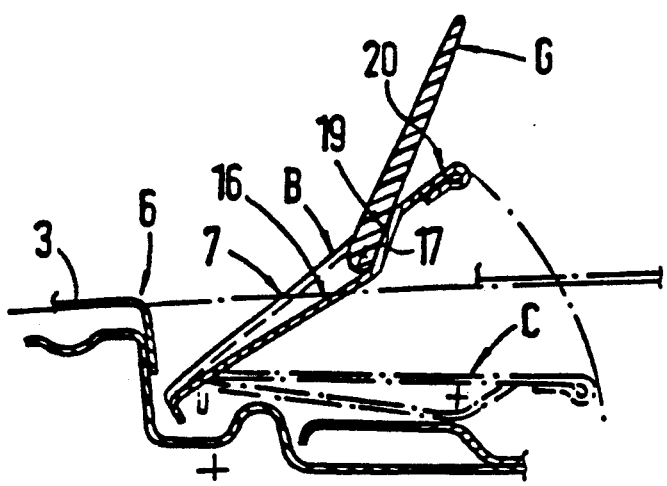
FIG. 5 is a sectional view corresponding to FIG. 3 with a modified embodiment of the wind deflector.

Since sliding roof rumbling occurs mainly at speeds below 80 km/h and no longer occurs at higher speeds, the bending of the air guiding element 13 does not impair the operation of the device. Rather, by means of this bending, wind noise in the vehicle interior 12 is largely avoided at higher speeds. By means of this type of an air guiding element, the extension of the wind deflector 7 according to FIG. 5 is not necessary.

Figure 2:
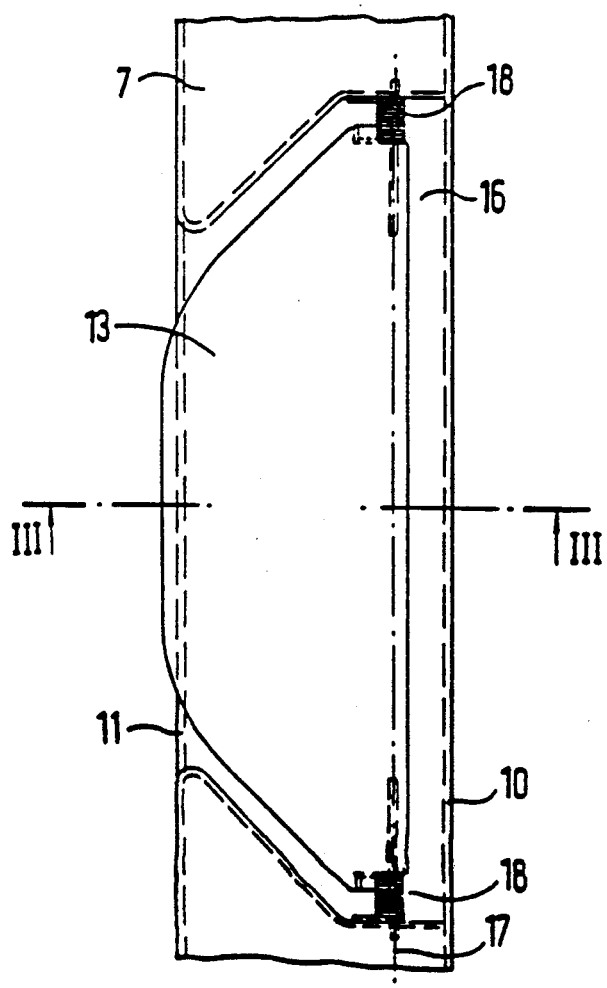
FIG. 2 is a partial top view of the wind deflector with the air guiding element according to the invention.

In top view, the air guiding element 13 may be constructed to be either rectangular or approximately trapezoidal according to FIG. 2.

A guide shoe 21 is placed on the under side front edge area of the sliding cover 5 to aid in retracting and releasing of the guide element. When the sliding roof is closed, the wind deflector 7 is first lowered until the guide shoe 21 swivels the air guiding element 13 counterclockwise. Both operations take place simultaneously leading to the inoperative position C (FIG. 5).

In the moved-in inoperative position C, the folded-together air guiding element 13 is located in the depression 16 of the wind deflector 7 (see FIG. 3; position F).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A wind deflector assembly for a motor vehicle having a movable roof and a roof cut-out which has a transversely extending front edge, the assembly comprising:
   a wind deflector movably mounted adjacent to the front edge of the cut-out, the deflector being movable between a retracted sunk-in inoperative position and an extended moved-out operative position, the wind deflector having a depression including a bottom which faces an interior of the motor vehicle; and
   an air guiding element flexibly mounted on the wind deflector to be movable between a first position in which the air guiding element is in the depression of the wind deflector and a second position in which the air guiding element projects diagonally above and rearward of a trailing edge of the wind deflector when the wind deflector is in the operative position, the second position being an operative position of the air guiding element.

2. A wind deflector according to claim 1, wherein the air guiding element is mounted at a position adjacent to a longitudinal center plane of the motor vehicle.

3. A wind deflector according to claim 1, wherein the air guiding element has a width which is at least 1/10 of a width of the roof cut-out.

4. A wind deflector according to claim 1, wherein an overall height from the front edge of the roof cut-out to an upper edge of the air guiding element when the wind deflector is in the extended moved-out operative position is at least 1/7 of a length of the roof cut-out.

5. A wind deflector according to claim 1, wherein the additional air guiding element has a height which is at least 1/10 of the length of the roof cut-out.

6. A wind deflector according to claim 1, wherein the air guiding element forms an angle with respect to the wind deflector in the operative position of the air guiding element of approximately 30 degrees.

7. A wind deflector according to claim 1, wherein the wind deflector has an outer free end including a support area for positioning the air guiding element when the wind deflector is in the operative position.

8. A wind deflector according to claim 7, wherein the wind deflector has an extension behind the support area.

9. A wind deflector according to claim 8, wherein the extension is substantially parallel to the wind deflector.

10. A wind deflector according to claim 1, further comprising a guide shoe mounted at a front edge of the movable roof
    for moving the air guiding element into the first position when the movable roof is closed.

11. A wind deflector assembly for a motor vehicle having a movable roof and a roof cut-out which has a transversely extending front edge, the assembly comprising:
    a wind deflector movably mounted adjacent to the front edge of the cut-out, the deflector being movable between a retracted sunk-in inoperative position and an extended moved-out operative position, the wind deflector having a depression including a bottom which faces an interior of the motor vehicle;
    an air guiding element flexibly mounted on the wind deflector by way of a horizontally aligned, transversely extending shaft to be movable between a first position in which the air guiding element is in the depression of the wind deflector and a second position in which the air guiding element projects diagonally above and rearward of a trailing edge of the wind deflector when the wind deflector is in the operative position, the second position being an operative position of the air guiding element; and
    spring elements coupled to the air guiding element for moving the air guiding element into the second position.

* * * * *